United States Patent
Ciloglu et al.

(10) Patent No.: US 9,238,419 B2
(45) Date of Patent: Jan. 19, 2016

(54) CONDUCTOR RAIL

(75) Inventors: Korhan Ciloglu, Pittsburgh, PA (US); David Mayfield, South Bend, IN (US)

(73) Assignee: L. B. Foster Company, Pittsburgh, PA (US)

(*) Notice: Subject to any disclaimer, the term of this patent is extended or adjusted under 35 U.S.C. 154(b) by 26 days.

(21) Appl. No.: 13/520,080

(22) PCT Filed: Dec. 30, 2010

(86) PCT No.: PCT/US2010/062520
§ 371 (c)(1),
(2), (4) Date: Nov. 27, 2012

(87) PCT Pub. No.: WO2011/082311
PCT Pub. Date: Jul. 7, 2011

(65) Prior Publication Data
US 2013/0098726 A1    Apr. 25, 2013

Related U.S. Application Data

(60) Provisional application No. 61/291,599, filed on Dec. 31, 2009.

(51) Int. Cl.
*B60M 1/30*    (2006.01)

(52) U.S. Cl.
CPC .................... *B60M 1/302* (2013.01)

(58) Field of Classification Search
CPC ........ B60M 1/302; B60M 1/30; B60M 1/305; E01B 5/08; B23K 33/00
USPC ................ 191/22 DM, 29 DM; 238/141, 143
See application file for complete search history.

(56) References Cited

U.S. PATENT DOCUMENTS

| 85,673 A | * | 1/1869 | King | ............................... 238/141 |
| 283,760 A | * | 8/1883 | Daft | ............................... 428/676 |

(Continued)

FOREIGN PATENT DOCUMENTS

| DE | 2147956 A1 | 3/1973 |
| DE | 2219252 A1 | 11/1973 |

(Continued)

OTHER PUBLICATIONS

Form PCT/ISA/220, PCT Notifiction of Transmittal of the International Search Report and the Written Opinion of the International Search Authority, or the Declaration, PCT/US2010/062520, Date Mailed Mar. 2, 2012.

(Continued)

*Primary Examiner* — Mark Le
(74) *Attorney, Agent, or Firm* — Clark Hill PLC; Paul D. Bangor, Jr.

(57) ABSTRACT

A conductor rail assembly for use in transit rail transportation systems to transmit electrical power to rail cars comprising a first and second support sections preferably of aluminum to give the rail assembly its rail-shape and conductivity and a cap section preferably of stainless steel to provide a wear resistant surface to prevent damaging of the conductor rail by collector shoes that extend from rail cars and run on the conductor rail. The first support section has a rib and the second support section has a concavity. In the assembly, the rib of the first support member preferably is disposed within the concavity of the second support member, portions of both support members preferably are friction fit or compression fit within the cap and a friction stir weld preferably is disposed on the bottom of the assembly along a joint between the first and second support sections.

18 Claims, 5 Drawing Sheets

(56) References Cited

U.S. PATENT DOCUMENTS

| | | | |
|---|---|---|---|
| 1,042,545 A | | 10/1912 | Gamwell |
| 1,433,973 A | * | 10/1922 | Shaver .................. 191/29 DM |
| 1,794,287 A | * | 2/1931 | Germann .................. 246/416 |
| 5,310,032 A | | 5/1994 | Plichta |
| 6,983,834 B1 | * | 1/2006 | Kraudy .................. 191/22 DM |
| 7,520,104 B2 | * | 4/2009 | Aota et al. .................. 52/783.1 |

FOREIGN PATENT DOCUMENTS

| | | |
|---|---|---|
| FR | 2155483 A5 | 5/1973 |
| FR | 2389510 A1 | 12/1978 |
| WO | WO99/58288 A1 | 11/1999 |

OTHER PUBLICATIONS

Form PCT/ISA/210, PCT International Search Report for International Application No. PCT/US2010/062520, Dated Mailed Mar. 2, 2012.

Form PCT/ISA/237, PCT Written Opinion of the International Searching Authority for International Application No. PCT/US2010/062520, Date Mailed Mar. 2, 2012.

* cited by examiner

CONDUCTOR RAIL

CROSS REFERENCE TO RELATED APPLICATIONS

This application claims the benefit of provisional patent application U.S. Ser. No. 61/291,599 filed Dec. 31, 2009, by the present inventor(s), which is incorporated by reference herein.

TECHNICAL FIELD OF THE INVENTION

This invention relates to a conductor rail assembly comprising a construction primarily of aluminum and stainless steel.

BACKGROUND

Field of the Disclosure

Conductor rails are used in transit rail transportations systems to transmit electric power to railcars. They can be made of solid steel sections or a combination of aluminum and steel sections to take advantage of aluminum's high electrical conductivity and light weight. The present invention comprises a novel conductor rail construction and method for combining two aluminum sections with a stainless steel section in a conductor rail application.

Conductor rails (a.k.a power rail or third rail) are used in transit rail transportation systems for transmission of electrical power to rail cars. Original design of conductor rail goes back to Thomas Edison's 1882 patent, U.S. Pat. No. 263,132. The evolution of the conductor rail has been dictated by the power requirements of railcars as well as by the needs in improving overall power system safety and efficiency. There are three main types of power rails in common use today across the world. 1) a power rail similar to the one shown in the T. Edison patent made of solid steel; 2) a power rail comprising a steel rail section and two aluminum extruded sections bolted on the web of the steel rail. This design is know as "clad rail" in the industry; and 3) an aluminum rail with stainless steel cap.

Aluminum has been incorporated in the power rail types 2 and 3 because its conductivity is significantly more than that of steel. Aluminum is the third most conductive metal after silver and copper. It has been proven to be the cost effective option for this application. Adding aluminum to the design increases conductivity which results in decreased power loss during transmission of power over long distances without a substantial increase in cost. Furthermore, aluminum based designs are significantly lighter than their solid steel counterparts. The present invention incorporates two aluminum support sections and a stainless steel cap section. The aluminum support sections are used to give the conductor rail of the present invention its desired shape and conductivity. The stainless steel cap is used as a wear surface. A wear surface is needed to prevent damaging of the conductor rail by collector shoes that extend from rail cars and run on the conductor rail as the train moves.

BRIEF SUMMARY OF THE INVENTION

In a first aspect, the present invention comprises a conductor rail assembly comprising: a cap; a first support member defining a rib; a second support member defining a concavity; wherein portions of each of the first and second support members are friction fit or compression fit within the cap; and wherein the rib of the first support member is disposed with the concavity of the second support member.

In another aspect, the present invention comprises a conductor rail assembly having a friction stir weld disposed along a joint between the first and second support members and/or bolts fastening the first and second support members together.

In yet another aspect, the present invention comprises a conductor rail assembly wherein the cap defines a top of the conductor rail assembly and the friction stir weld is disposed on a bottom of the conductor rail assembly.

In yet a further aspect, the present invention comprises a conductor rail assembly wherein the first and second support members are aluminum and the cap is stainless steel.

In yet an additional aspect, the present invention comprises a conductor rail assembly further comprising a copper element disposed between the first and second support members or within or in a conduit defined by one or more of the first and second support members.

In another aspect, the present invention comprises a conductor rail assembly further comprising a no-oxide paste disposed between the cap and the support members.

In a yet a further aspect, the present invention comprises a method for making a conductor rail assembly comprising: rotating first and second elongated support members about respective longitudinal axes so that they can be compression fit within a top cap; depositing a friction stir weld over the joint between the respective bottoms of the first and second elongated support members.

In a yet an additional aspect, the present invention comprises a method for making a conductor rail assembly wherein the first and second support members are aluminum and the cap is stainless steel.

In a yet another aspect, the present invention comprises a method for making a conductor rail assembly further comprising: applying a no-oxide paste between the cap and the support members.

In a further aspect, the present invention comprises a method for making a conductor rail assembly further comprising: disposing a copper element (1) between the first and second support members or (2) in a conduit defined by the first and second support members.

BRIEF DESCRIPTION OF THE DRAWINGS

For the present disclosure to be easily understood and readily practiced, the present disclosure will now be described for purposes of illustration and not limitation in connection with the following figures, wherein.

DETAILED DESCRIPTION OF PREFERRED EMBODIMENT(S) OF THE INVENTION

Figure 1:
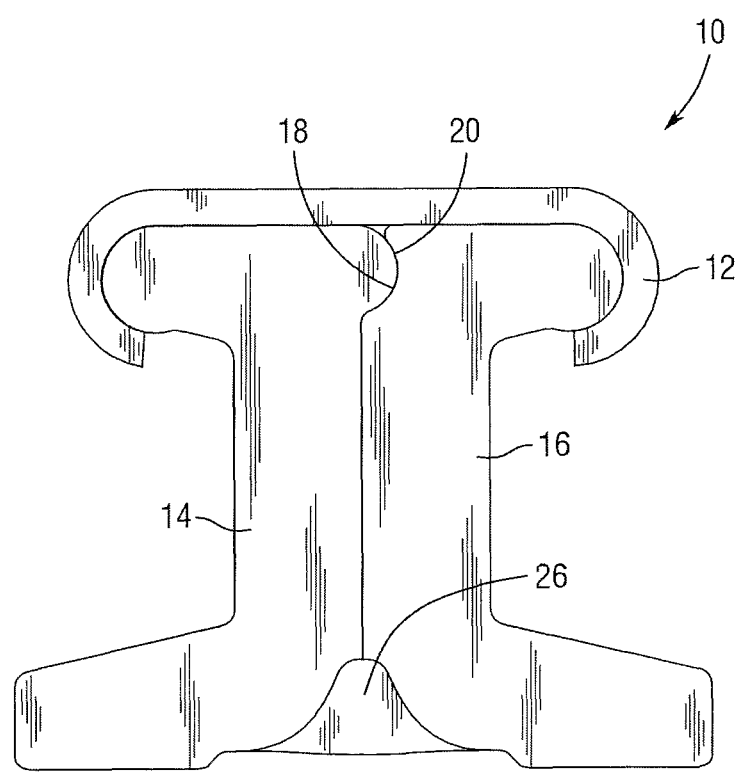
FIG. 1 is a cross-sectional view of a conductor rail according to a preferred embodiment of the present invention.
Figure 2A:
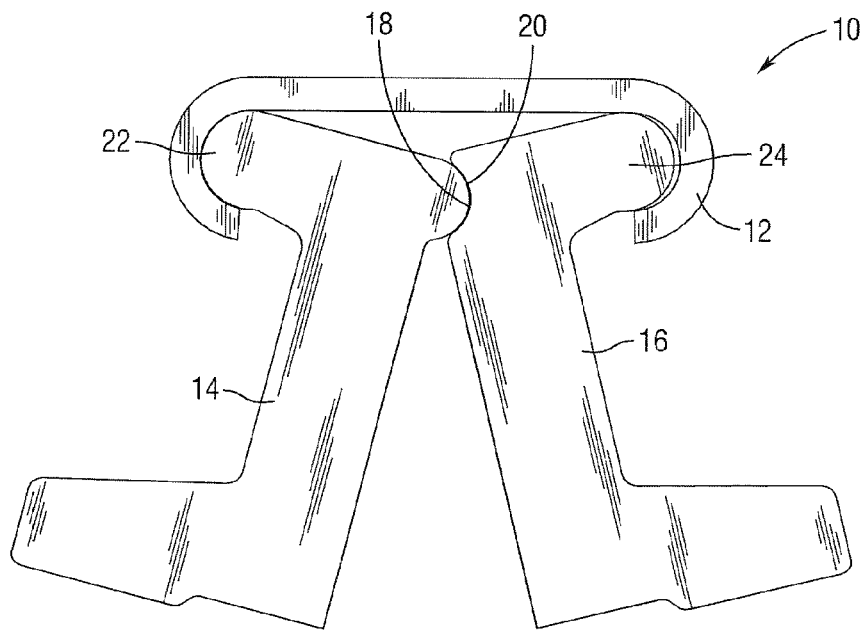
FIG. 2A is a partially exploded, cross-sectional view of the conductor rail of FIG. 1.
Figure 2B:
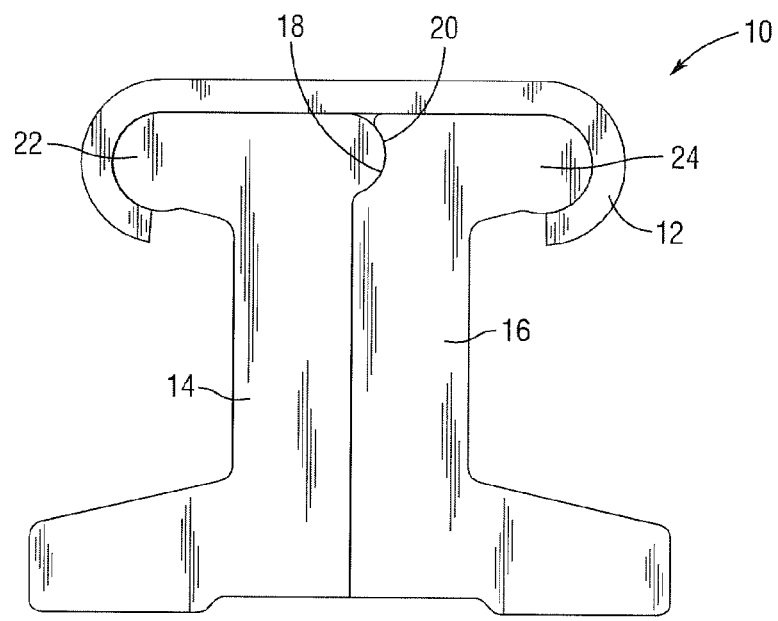
FIG. 2B is another cross-sectional view of the conductor rail of FIG. 1.
Figure 3A:
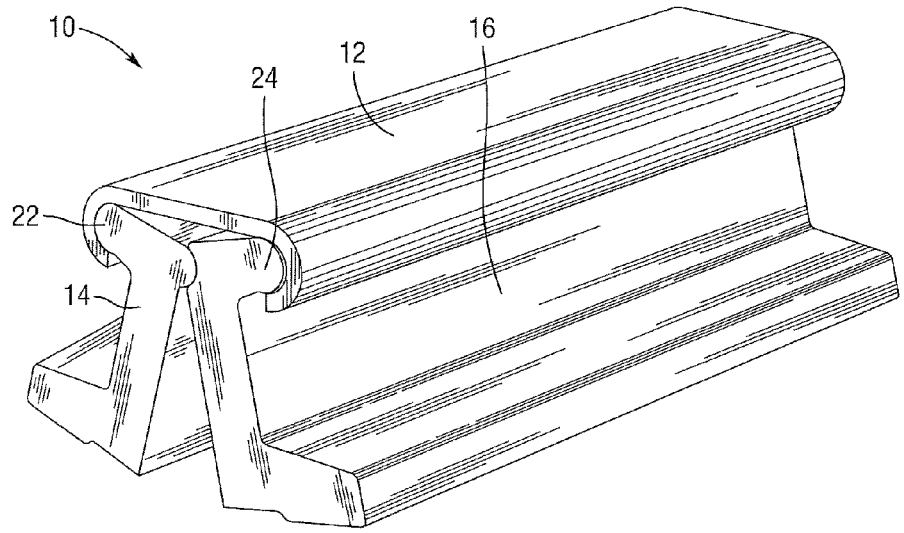
FIG. 3A is a partially exploded, top perspective view of the conductor rail of FIG. 1.
Figure 3B:
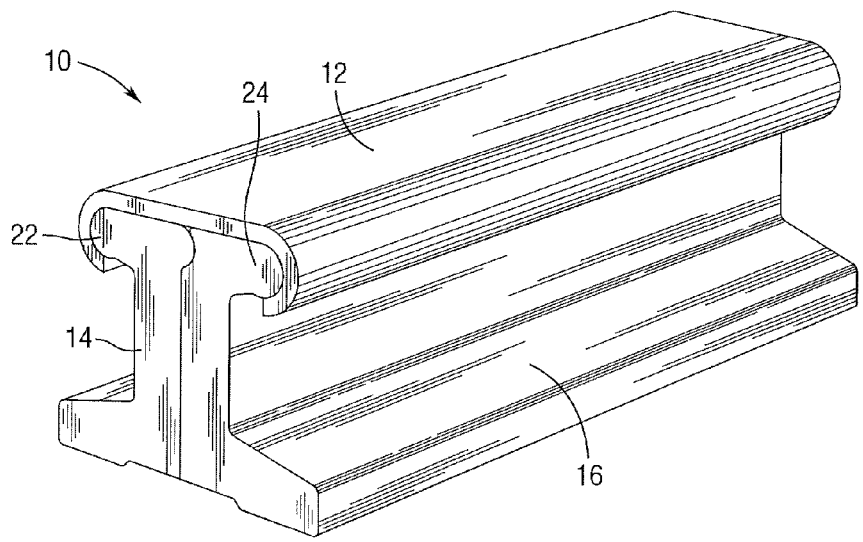
FIG. 3B is a top perspective view of the conductor rail of FIG. 1.
Figure 4:
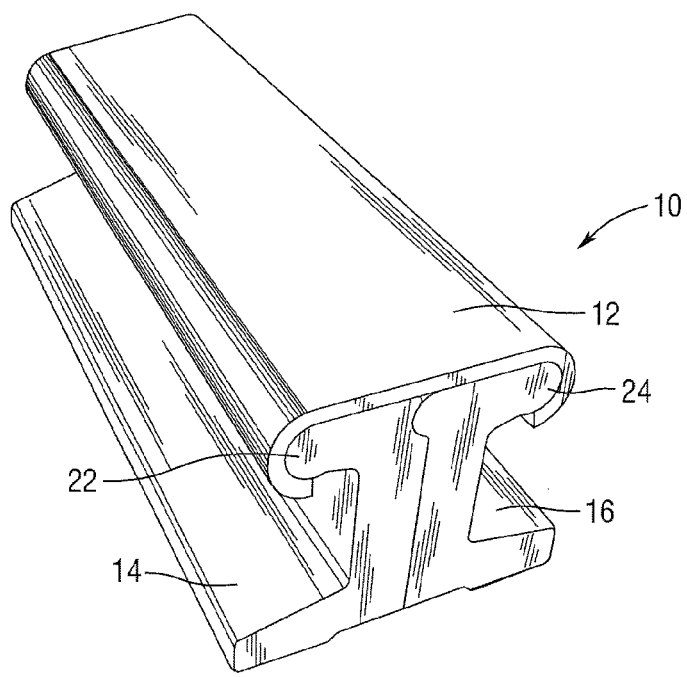
FIG. 4 is another top perspective view of the conductor rail of FIG. 1.
Figure 5:
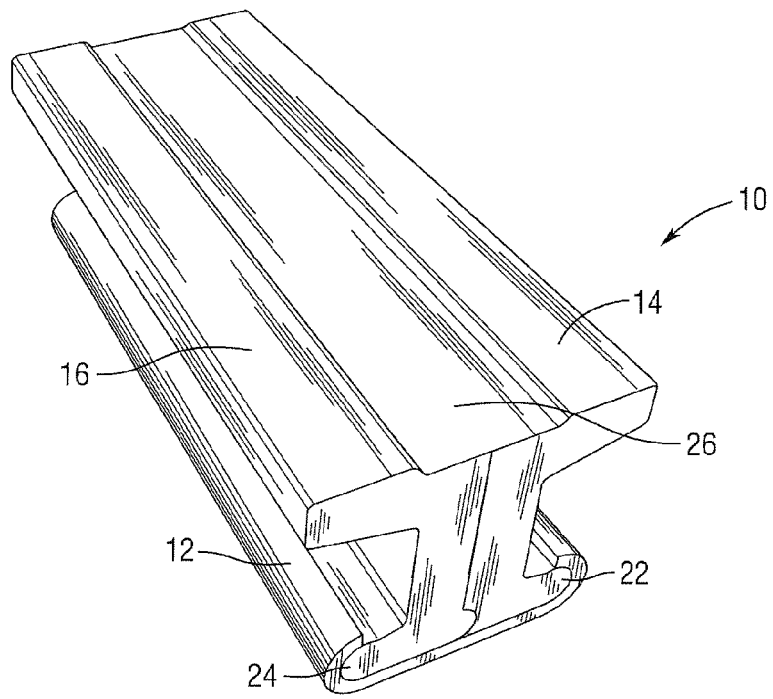
FIG. 5 is a bottom perspective view of the conductor rail of FIG. 1.

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

FIGS. 1-5 illustrate a conductor rail 10 according to a preferred embodiment of the present invention comprising a cap 12 and first and second support members 14 and 16, respectively. Preferably, cap 12 is made from stainless steel and more preferably, 430 stainless steel or an equivalent thereof. First and second support members 14 and 16 are preferably made from aluminum and more preferably from 6101-T6 electrical grade aluminum or an equivalent thereof.

First and second support members 14 and 16, are assembled with cap 12 as shown in FIGS. 2A, 2B, 3A and 3B, by rotating each of the first and second support members 14 and 16, along a respective longitudinal axis so that the respective top portions 22 and 24 fit into cap 12 for assembly. Next, as shown therein, first support member 14 defines a rib 18 running along it longitudinally which fits into a channel, slot or other elongated concavity 20 preferably defined by second support member 16. Such a friction fitting, key-type construction provided by rib 18 and channel 20 may be provided continuously or intermittently along the length of the conductor rail 10.

After the first and second support members 14 and 16 are fit into the cap 12 with or without any other components as described herein, they are joined together preferably by welding and/or with other fasteners such as huck bolts, and more preferably, by Friction Stir Welding (FSW), along the bottom surfaces of first and second support members 14 and 16, preferably along the joint therebetween and across the entire length of conductor rail 10 creating longitudinal weld 26.

Figure 6A:
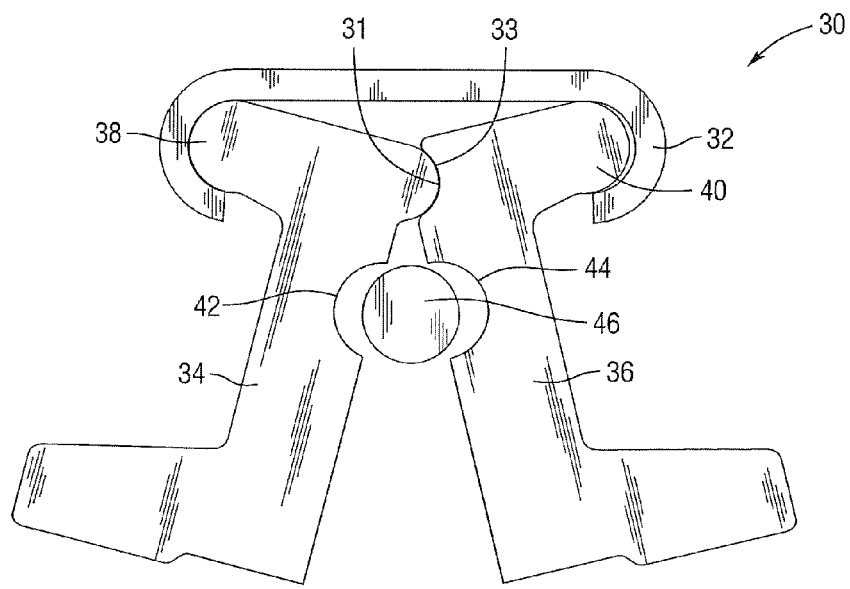
FIG. 6A is a partially exploded, cross-sectional view of a conductor rail according to another preferred embodiment of the present invention.
Figure 6B:
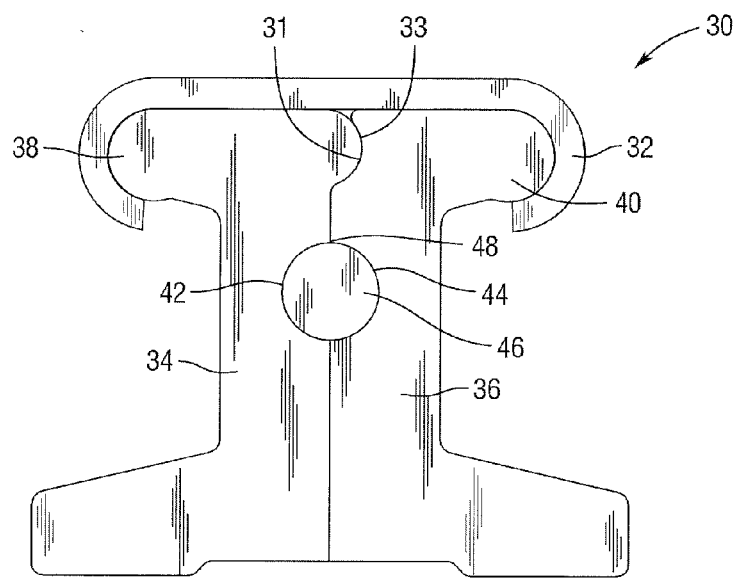
FIG. 6B is cross-sectional view of the conductor rail of FIG. 6A.

FIGS. 6A and 6B illustrate another preferred embodiment of a conductor rail 30 according to the present invention comprising a cap 32 and first and second support members 34 and 36, respectively. Preferably, cap 32 is made from stainless steel and more preferably, 430 stainless steel or an equivalent thereof. First and second support members 34 and 36 are preferably made from aluminum and more preferably from 6101-T6 electrical grade aluminum or an equivalent thereof. Conductor rail 30 further comprises an electrical conductivity enhancing element 46 preferably disposed within concave recesses 42 and 44 defined by first and second support members 34 and 36, respectively. Enhancing element 46 preferably is made from copper and, while shown having a circular cross-section, may take any form or shape as required by the design of the conductor rail 30 and/or the overall conductivity level required for the conductor rail 30. First and second support members 34 and 36, are assembled with cap 32 as shown in FIGS. 6A and 6B by rotating each of the first and second support members 34 and 36, along a respective longitudinal axis so that the respective top portions 38 and 40 fit into cap 32 for assembly. Next, as shown therein, first support member 34 defines a rib 31 running along it longitudinally which fits into a channel, slot or other elongated concavity 33 preferably defined by second support member 36. Such a friction fitting, key-type construction provided by rib 31 and channel 33 may be provided continuously or intermittently along the length of the conductor rail 30. In addition, during assembly as shown in FIGS. 6A and 6B, enhancing element 46 is disposed or held between concave recesses 42 and 44 so that after assembly is complete, enhancing element is preferably completely disposed within the conduit 48 formed by concave recesses 42 and 44. After the first and second support members 34 and 36 are fit into the cap 32 with enhancing element 46 disposed within the conduit 48 as described above, they are joined together preferably by welding and/or with other fasteners such as huck bolts, and more preferably, by Friction Stir Welding (FSW) along the bottom surfaces of first and second support members 34 and 36, preferably along the joint therebetween and across the entire length of conductor rail 30 creating longitudinal weld in the same manner as described above with respect to conductor rail 10.

The overall conductivity level of the conductor rail assembly 10 is preferably 1.4 microohm/ft, 2.0 microohm/ft or 4 microohm/ft wherein the cross sectional area and shape of the conductor rail assembly 10 overall and of the first and second support members 14 and 16 may be adjusted to provide the desired conductivity level of the conductor rail assembly 10 overall. The electrical conductivity in the conductor rails 10 and/or 30 of the present invention can be set to any reasonable value by changing the cross sectional area of the components thereof. Using only aluminum and stainless steel in the design will require a change in rail geometry if conductivity needs to be different than the standard value (i.e. 1.4 microohm/ft). However, change in conductivity can also be accomplished by using a third element such as copper, such as in electrical conductivity enhancing element 46, in the design while keeping the geometrical envelope stationary as shown in FIGS. 6A and 6B.

While not shown, a non-oxide or no-oxide paste (such as the no-oxide paste available from Sanchem, Inc) is preferably applied between the stainless steel and aluminum components, as well as between those components and any other dissimilar metal boundaries such as between the copper or other metallic components employed in the conductor rail assemblies 10 and/or 30 to prevent galvanic corrosion between dissimilar materials.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A conductor rail assembly comprising:
   a cap;
   a first support member defining a rib in the form of a convex projection that forms an uppermost part of a side of the first support member;
   a second support member defining a concavity;

wherein portions of each of the first and second support members are friction fit or compression fit within the cap; and wherein the rib of the first support member is disposed with the concavity of the second support member; and wherein the first support member and second support member are joined together by a weld along a joint between bottom surfaces of the first and second support members.

2. The conductor rail assembly of claim 1 wherein the weld comprises a friction stir weld.

3. The conductor rail assembly of claim 2 wherein the cap defines a top of the conductor rail assembly.

4. The conductor rail assembly of claim 1 wherein the first and second support members are aluminum and the cap is stainless steel.

5. The conductor rail assembly of claim 3 wherein the first and second support members are aluminum and the cap is stainless steel.

6. The conductor rail assembly of claim 1 further comprising a copper element disposed between the first and second support members or within or in a conduit defined by one or more of the first and second support members.

7. The conductor rail assembly of claim 3 further comprising a copper element disposed between the first and second support members or within or in a conduit defined by one or more of the first and second support members.

8. The conductor rail assembly of claim 4 further comprising a copper element disposed between the first and second support members or within or in a conduit defined by one or more of the first and second support members.

9. The conductor rail assembly of claim 5 further comprising a copper element disposed between the first and second support members or within or in a conduit defined by one or more of the first and second support members.

10. The conductor rail assembly of claim 4 further comprising a no-oxide paste disposed between the cap and the support members.

11. The conductor rail assembly of claim 5 further comprising a no-oxide paste disposed between the cap and the support members.

12. A method of making the conductor rail assembly of claim 1 comprising:

rotating the first and second support members about respective longitudinal axes so that they can be compression fit within the cap; and providing said weld by depositing a friction stir weld over the joint between the bottom surfaces of the first and second support members.

13. The method for making a conductor rail assembly of claim 12 wherein the first and second support members are aluminum and the cap is stainless steel.

14. The method for making a conductor rail assembly of claim 12 further comprising:

applying a no-oxide paste between the cap and the support members.

15. The method for making a conductor rail assembly of claim 12 further comprising:

disposing a copper element between the first and second support members.

16. The method for making a conductor rail assembly of claim 12 further comprising:

disposing a copper element in a conduit defined by the first and second support members.

17. The method for making a conductor rail assembly of claim 13 further comprising:

disposing a copper element between the first and second support members.

18. The method for making a conductor rail assembly of claim 13 further comprising:

disposing a copper element in a conduit defined by the first and second support members.

* * * * *